United States Patent
McNulty et al.

(10) Patent No.: US 7,748,218 B2
(45) Date of Patent: Jul. 6, 2010

(54) SYSTEM AND METHOD FOR ACHIEVING ENGINE BACK-PRESSURE SET-POINT BY SELECTIVELY BYPASSING A STAGE OF A TWO-STAGE TURBOCHARGER

(75) Inventors: Michael J. McNulty, Lombard, IL (US); Christopher R. Ciesla, Palos Heights, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 11/426,427

(22) Filed: Jun. 26, 2006

(65) Prior Publication Data

US 2007/0295007 A1 Dec. 27, 2007

(51) Int. Cl.
F02B 33/44 (2006.01)
F02B 33/00 (2006.01)
F02B 37/00 (2006.01)
F02B 37/013 (2006.01)
F02B 37/16 (2006.01)
F02B 37/24 (2006.01)
F02M 25/07 (2006.01)

(52) U.S. Cl. .......................... 60/612; 60/605.2; 60/611; 123/562

(58) Field of Classification Search .................. 60/612, 60/611, 602; 123/562; F02B 37/00, 37/013, F02B 37/16, 37/24
See application file for complete search history.

(56) References Cited

U.S. PATENT DOCUMENTS 5,063,744 A * 11/1991 Ishiyama et al. ............... 60/612
6,311,493 B1 * 11/2001 Kurihara et al. ............... 60/612
6,378,308 B1 * 4/2002 Pfluger ........................ 60/612
6,801,846 B1 * 10/2004 Rodriguez et al. ............. 60/612
7,000,393 B1 * 2/2006 Wood et al. ................... 60/612
7,302,800 B2 * 12/2007 Klingel ........................ 60/612
2006/0059910 A1 * 3/2006 Spaeder et al. ................ 60/612
2006/0070381 A1 * 4/2006 Parlow et al. ................. 60/612
2006/0123782 A1 * 6/2006 Rosin et al. ................... 60/612
2007/0068158 A1 * 3/2007 Sun et al. .................... 60/605.2
2007/0107430 A1 * 5/2007 Schmid et al. ................ 60/612
2007/0151243 A1 * 7/2007 Stewart ........................ 60/612

FOREIGN PATENT DOCUMENTS

EP        1275832 A2 *  1/2003
JP     2005315163 A  * 11/2005
JP     2007100628 A  *  4/2007
JP     2007138845 A  *  6/2007
JP     2007154684 A  *  6/2007
JP     2007263040 A  * 10/2007
WO   WO 2006106058 A1 * 10/2006
WO   WO 2007083131 A1 *  7/2007

* cited by examiner

Primary Examiner—Thai-Ba Trieu
(74) Attorney, Agent, or Firm—Jack D. Nimz; Jeffrey P. Calfa

(57) ABSTRACT

A control system for operating vanes of a turbocharger turbine (16T) and for operating a turbine-shunting bypass valve (22) according to a strategy wherein a processor executes an algorithm for selectively unenabling the control system to operate the bypass valve when the control system is operating the vanes to adjust exhaust back-pressure on the engine within a range of effectiveness for the vanes to control the exhaust back-pressure and enabling the control system to operate the bypass valve when the control system has operated the mechanism to a limit of the range of effectiveness.

15 Claims, 5 Drawing Sheets

SYSTEM AND METHOD FOR ACHIEVING ENGINE BACK-PRESSURE SET-POINT BY SELECTIVELY BYPASSING A STAGE OF A TWO-STAGE TURBOCHARGER

FIELD OF THE INVENTION

This invention relates to turbocharged internal combustion engines, particularly a motor vehicle diesel engine that has a two-stage turbocharger where one turbine stage has variable geometry.

BACKGROUND OF THE INVENTION

Turbocharged diesel engines are common powerplants of trucks that are presently being built. A known turbocharged engine comprises a two-stage turbocharger that comprises high- and low-pressure turbines in series flow relationship in the exhaust system that operate high- and low-pressure compressors in series flow relationship in the intake system to develop boost. The high-pressure turbine of a particular type of two-stage turbocharger has vanes that can be controlled by an actuator to control both torque that operates the high-pressure compressor and exhaust back-pressure. Such a turbocharger is sometimes called a variable geometry turbocharger, or VGT for short.

The high-pressure VGT stage is typically designed to have a relatively smaller size that is optimized for low-end engine performance while the low-pressure stage is typically designed with a relatively larger size for high-end performance. The high-pressure stage has the ability to respond well to transient demands at lower engine speeds and is the main contributor to boost over that speed range. At higher speeds, and at larger loads, the low-pressure stage becomes the main contributor to boost because it can provide the necessary greater air-handling capacity. Over a portion of an engine operating range, the high-pressure stage may however interact with the low-pressure stage in ways that affect turbocharger performance.

Compensation for such interaction can be achieved by the inclusion of two bypass valves, one shunting the high-pressure compressor stage and another shunting the high-pressure turbine stage. By opening in the higher speed and load range to shunt flows around the high-pressure stages, the bypass valves prevent the high-pressure stages from choking the flows.

The operation of each bypass valve is controlled in concert with operation of the other, and their operation is coordinated with control of the VGT vanes. The engine control system processes various data according to algorithms to provide control functions for the VGT vanes and the bypass valves such that exhaust back-pressure and engine boost are regulated in a way deemed appropriate for the manner in which the engine is being operated.

For various reasons that bear on engine performance and/or emission control, the ability to accurately control exhaust back-pressure is important to an engine control strategy. A typical strategy processes various data to develop a data value for a desired set-point for exhaust back-pressure. Changes in engine operation that affect that set-point typically call for the control system to respond promptly and accurately to force the actual exhaust back-pressure to follow the changes in the desired set-point.

In the lowest speed range, exhaust back-pressure can be controlled entirely by control of the VGT vanes. When the engine operating conditions change such that exhaust back-pressure can no longer be controlled solely by the VGT vanes, the bypass valves should open. It is desirable that the transition from VGT control to bypass valve control, and vice versa, occur in ways that avoid interactions between the VGT vanes and the bypass valves that would result in undesired effects on control accuracy, such as delayed response, pressure spikes, etc.

SUMMARY OF THE INVENTION

The present invention is directed to a system and method for a coordinated control strategy for a VGT and associated bypass valves that strives to avoid such undesired effects in control of the exhaust back-pressure set-point.

The invention is effective to control the opening of the bypass valves as engine speed and load increase beyond the range where exhaust back-pressure can be controlled by the VGT vanes alone, and similarly to control their closing as speed and load return to the range where the VGT vanes alone can be effective to control back-pressure.

While the disclosed preferred embodiment of the invention relates to a two-stage turbocharger having a variable geometry high-pressure turbine, the most general principles of the invention are believed applicable to certain other turbocharger configurations.

A generic aspect of the present invention relates to an internal combustion engine comprising an intake system for developing charge air for the engine, combustion chambers in which admitted charge air and injected fuel combust to operate the engine, an exhaust system for conveyance of exhaust gas resulting from combustion from the combustion chambers, a two-stage turbocharger comprising an upstream compressor upstream of a downstream compressor in the intake system operated respectively by a downstream turbine downstream of an upstream turbine in the exhaust system, a turbine-shunting bypass valve shunting one of the turbines with which a mechanism for adjusting exhaust back-pressure that the turbocharger is creating on the engine is associated, and a control system.

The control system comprises a processor that processes data to provide control data for operating the mechanism and for operating the turbine-shunting bypass valve. The processor executes an algorithm for selectively unenabling the control system to operate the bypass valve when the control system is operating the mechanism to adjust back-pressure within a range of effectiveness for the mechanism to control exhaust back-pressure and enabling the control system to operate the bypass valve when the control system has operated the mechanism to a limit of the range of effectiveness.

A further generic aspect of the present invention relates to the method that is inherent in the one generic aspect described above.

DESCRIPTION OF THE PREFERRED EMBODIMENT

Figure 1:
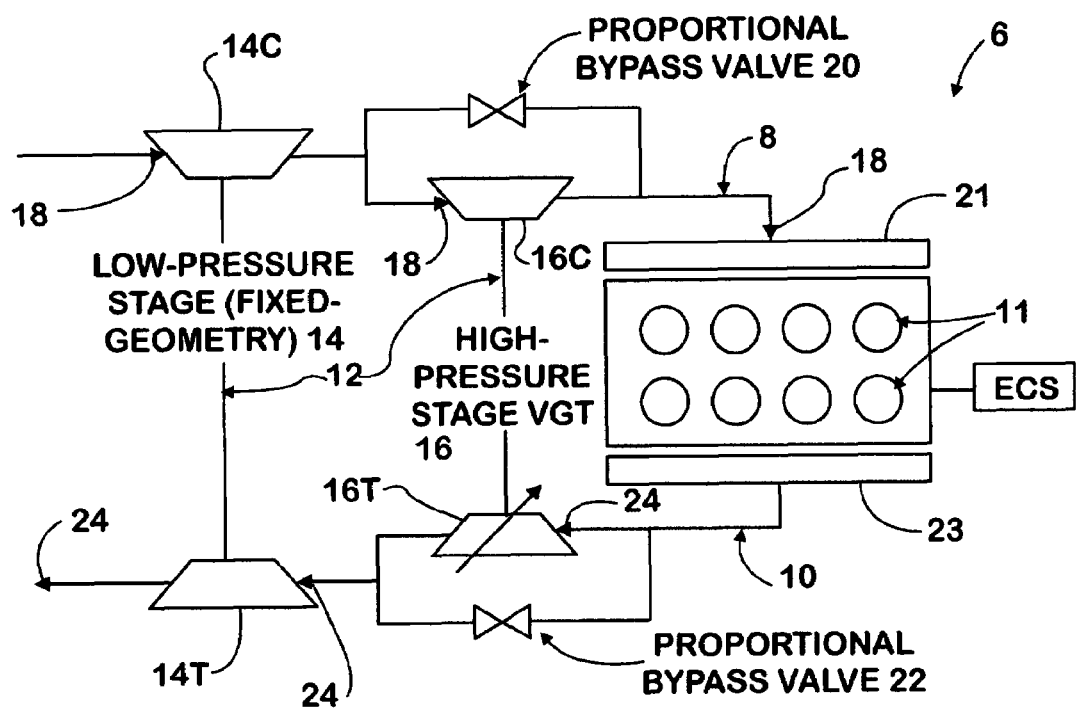
FIG. 1 is a general schematic diagram of an engine comprising a two-stage turbocharger and associated bypass valves controlled by a strategy in accordance with principles of the present invention.

FIG. 1 shows an exemplary internal combustion engine 6 having an intake system 8 through which air for combustion enters the engine and an exhaust system 10 through which exhaust gasses resulting from combustion of air-fuel mixtures in engine cylinders 11 exit the engine. Engine 6 is by way of example, a turbocharged diesel engine comprising a two-stage turbocharger 12 that has a low-pressure stage 14 and a high-pressure stage 16.

Air drawn into intake system 8 follows a path indicated by arrows 18, leading first to a compressor 14C of low pressure stage 14. A compressor 16C of high-pressure stage 16 is in downstream series flow relationship to compressor 14C and is shunted by a normally-closed valve 20 that may at times be referred to as a bypass valve or a bypass control valve. From compressor 14C there are two possible paths for airflow, one through compressor 16C, the other through bypass valve 20 when open. The charge air then enters an intake manifold 21 to which cylinders 11 are open when associated cylinder intakes valves are open. Fuel is injected into cylinders to combust with the charge air and release energy for powering the engine. Exhaust gasses from combustion exit through exhaust system 10.

The exhaust gasses leaving cylinders 11 entrain in an exhaust manifold 23 from whence they pass through exhaust system 10, as marked by arrows 24. From manifold 23, there are two possible flow paths for the exhaust gasses. One is through a high-pressure stage turbine 16T of stage 16. The other is through a bypass valve 22 that shunts stage 16T and that although normally closed, passes flow when operated open. Exhaust gasses then pass through a turbine 14T of stage 14 before exiting exhaust system 10.

Bypass valves 20 and 22 are proportional valves controlled by the engine control system (ECS). The engine control system processes various data to control valves 20 and 22 such that exhaust back-pressure, and consequently engine boost, are regulated in a appropriate manner according to the manner in which the engine is being operated.

By keeping bypass valves 20 and 22 closed during lower-speed engine operation the entire exhaust gas flow passes through both turbines 16T, 14T, and the entire charge air flow passes through both compressors 14C, 16C. In that speed range, exhaust back-pressure can be adequately controlled by an actuator that controls vanes of turbine stage 16T.

At speeds beyond the lower-speed range where the VGT vanes have reached their control limit, valves 20 and 22 open to an extent controlled by the engine control system to achieve desired boost and exhaust back-pressure.

The inventive strategy is embodied in one or more processors of the engine control system as algorithms for processing data. Through coordinated control of the VGT vanes and bypass valves 20 and 22, the strategy controls the set-point for exhaust back-pressure.

Figure 3:
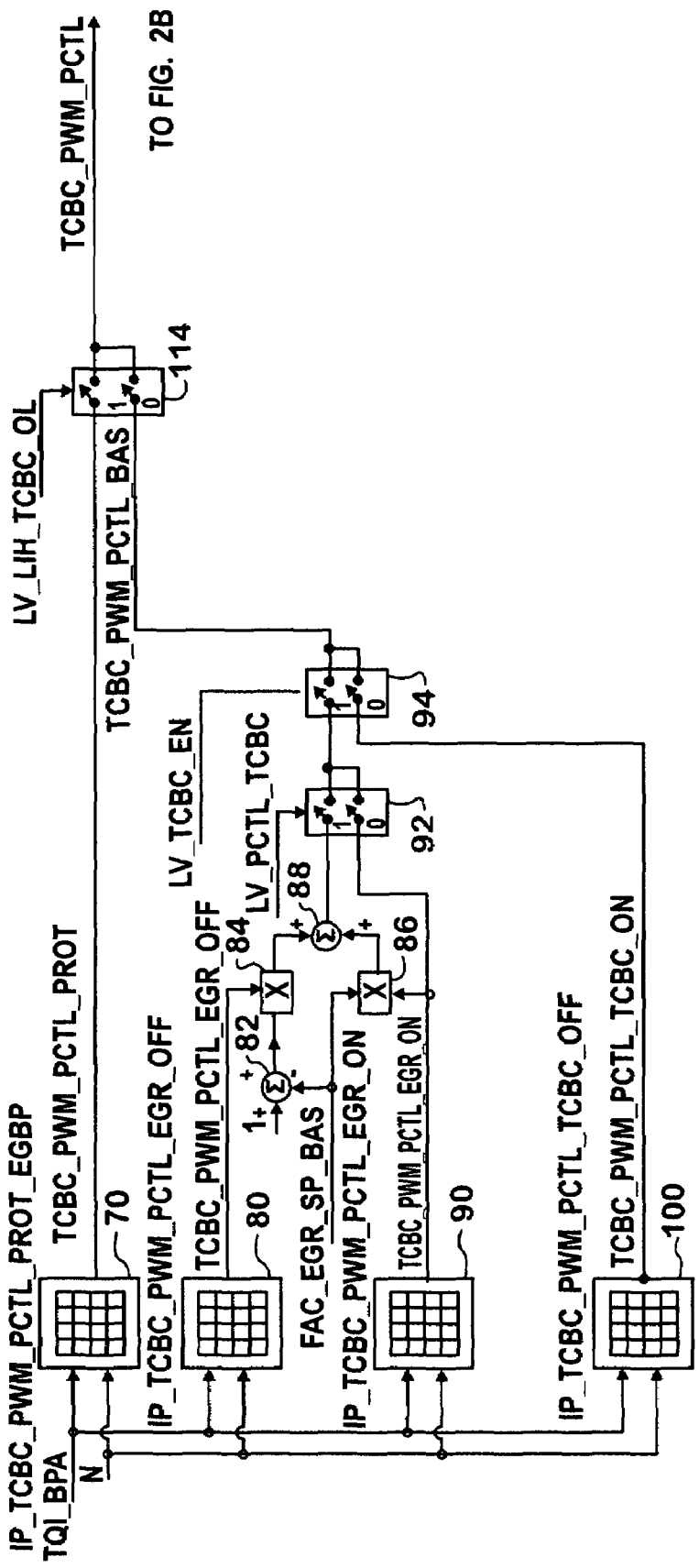
FIG. 3 shows a second portion of the software strategy diagram.
Figure 4:
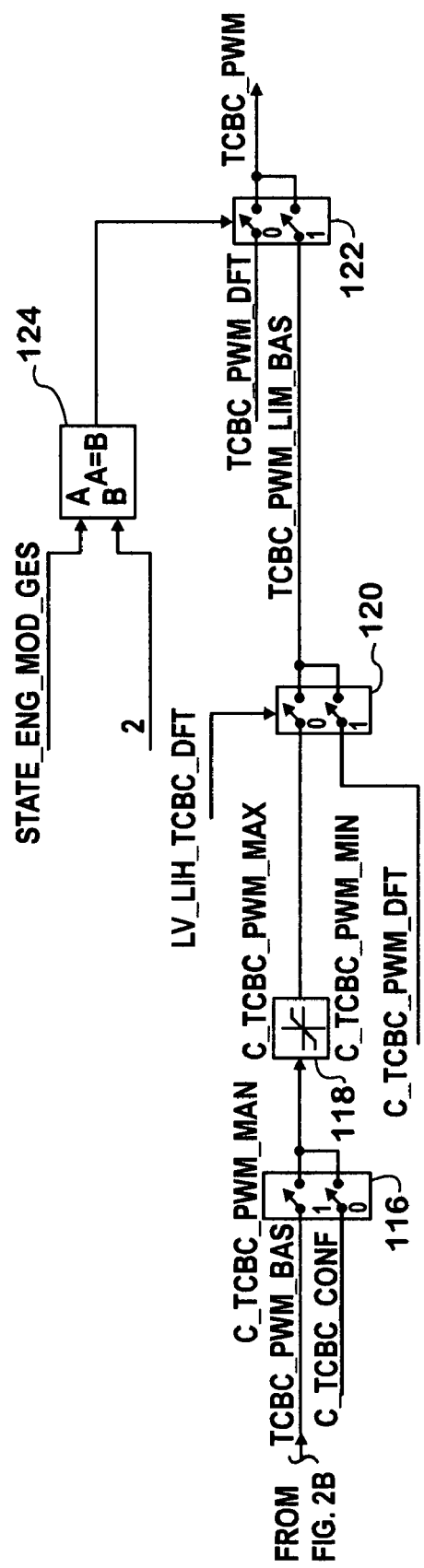
FIG. 4 shows a third portion of the software strategy diagram.

A parameter TCBC_PWM, shown in FIG. 4, controls valves 20 and 22. The data value for TCBC_PWM represents the duty cycle of a pulse width modulated signal that is applied to electric actuators of the two valves to control the extent to which they are open. The data value is developed by the engine control system's processing of various data in accordance with the strategy shown in FIGS. 2A, 2B, 3, and 4. The strategy employs various maps, or look-up tables, and various processing functions. Input data, which includes indicated engine torque TQI_BPA and engine speed N, is obtained from sensors, calculated from other data, and/or obtained from some other appropriate source.

When engine operation allows exhaust back-pressure to be controlled solely by the VGT vanes, only VGT control is used. It is when the VGT vanes reach their control limit that TCBC control is needed. TCBC control is enabled by the setting of a TCBC flag LV_TCBC_EN seen in FIG. 2B where a switch function 52 serves to selects one of two sub-strategies for enabling TCBC using a selection parameter LC_TCBC_EN_SEL.

When the data value for LC_TCBC_EN_SEL is a logic "0", a sub-strategy SS1 (FIG. 2A) that is based on the exhaust back-pressure set-point EGBP_SP, engine speed N, and engine torque TQI BPA is selected. When the data value for LC_TCBC_EN_SEL is a logic "1", a sub-strategy SS2 (FIG. 2A) that is based on engine speed N, engine torque TQI_BPA, and several additional parameters is selected. Which of the two sub-strategies is selected typically depends on the particular engine and how it has been calibrated for a particular engine model in a particular motor vehicle.

Sub-strategy SS1 comprises a map, or look-up table, 34 and a comparison function 36. Map 34 is populated with data values for EGBP_SP_MAX_TCBC_EN each correlated with a respective pair of data values representing a particular engine speed range and a particular engine torque range. Current data values for engine speed N and indicated torque TQI BPA cause the corresponding data value for EGBP_SP_MAX_TCBC_EN to be selected as the input to comparison function 36. The parameter EGBP_SP_MAX_TCBC_EN represents an exhaust back-pressure, based on current engine speed and torque, that can be satisfied by VGT control alone without invoking turbocharger bypass control (TCBC) using valves 20 and 22. Comparison function 36 compares the selected data value for EGBP_SP_MAX_TCBC_EN with a data value for the exhaust back pressure set point (parameter EGBP_SP) for the purpose of enabling TCBC control by setting LV_TCBC EN (the TCBC enable flag) to a logic "1" whenever VGT control becomes incapable of satisfying the exhaust back-pressure set-point by itself. As long as VGT control is capable of controlling exhaust back-pressure by itself, TCBC control remains unenabled.

Stated another way, comparison function 36 compares a data value representing a set-point for desired exhaust back-pressure (EGBP_SP) and a data value (EGBP_SP_MAX_TCBC EN) representing a set-point defining a maximum that is based on at least one parameter indicative of current engine operation (the embodiment shown here uses two—speed and torque) and that needs to be exceeded by the set-point for desired exhaust back-pressure in order to enable the control system to operate the bypass valves. The strategy will enable the control system to operate the bypass valves when the comparison function discloses that the set-point for desired exhaust back-pressure exceeds the defined maximum.

Sub-strategy SS2 comprises two maps, or look-up tables, 30, 32, four comparison functions 38, 40, 44, and 46, two AND logic functions 42, 48, and a latch function 50. Functions 38, 40, and 42 coact to set latch function 50 when certain conditions are satisfied, and functions 44, 46, and 48 coact to reset function 50 when certain other conditions are satisfied.

One necessary condition for setting latch function 50 is that the exhaust back-pressure error (meaning the difference between actual exhaust back-pressure and the exhaust back-pressure set-point) be less than a defined value of a parameter C_EGBP_DIF_TCBC_EN calibrated for the particular engine. The existence or non-existence of that condition is determined by comparison function 38.

A second necessary condition is that the duty cycle output to the VGT control, represented by a parameter BPAPWM, be less than a duty cycle, based on current engine speed and load, represented by a parameter BPAPWM_MIN_TCBC_EN. This second condition assures that the VGT is being controlled in a way that, for current engine speed and torque, the use of TCBC control will not be counterproductive to attaining the desired exhaust back-pressure set-point. Map 30 is populated with data values for BPAPWM_MIN_TCBC_EN each correlated with a respective pair of data values representing a particular engine speed range and a particular engine torque range. Current data values for engine speed and indicated torque cause the corresponding data value for BPAPWM_MIN_TCBC_EN to be selected as the input to comparison function 40.

AND logic function 42 will set latch function 50 when the two necessary conditions are simultaneously satisfied. Other conditions are necessary to reset latch function 50.

The coaction of functions 38, 40, and 42 causes latch function 50 to be operated to the set state when comparison function 38 discloses that the difference between the actual exhaust back-pressure and the set-point for desired exhaust back-pressure is disclosing a need to enable the control system to operate the bypass valves and when comparison function 40 at the same time is disclosing that the setting to which the adjustable vanes are being currently commanded is not within the range of settings within which the adjustable vanes can be effective by themselves in controlling exhaust back-pressure based on one or more current engine operating parameters, those parameters being speed and torque in this embodiment.

One necessary condition for resetting latch function 50 is that the exhaust back-pressure error EGBP_DIF_BPA be greater than the value of a parameter C_EGBP_DIF_TCBC_EXIT. The existence or non-existence of that condition is determined by comparison function 44.

A second necessary condition is that the data value for TCBC_PWM, be greater than that of a parameter TCBC_PWM_MAX_EXIT obtained from map 32. Map 32 is populated with data values for TCBC_PWM_MAX_EXIT each correlated with a respective pair of data values representing a particular engine speed range and particular engine torque range. Current data values for engine speed and indicated torque cause the corresponding data value for TCBC_PWM_MAX_EXIT to be selected as the input to comparison function 46.

AND logic function 48 discloses when both conditions are simultaneously satisfied by resetting latch function 50.

The coaction of functions 44, 46, and 48 causes latch function 50 to be operated to the reset state when comparison function 44 discloses that the difference between the actual exhaust back-pressure and the set-point for desired exhaust back-pressure is disclosing a need to unenable the control system to operate the bypass valves and when comparison function 46 at the same time is disclosing that the setting to which the adjustable vanes are being currently commanded is within the range of settings within which the adjustable vanes can be effective by themselves in controlling exhaust back-pressure based on one or more current engine operating parameters.

When the selected sub-strategy, either SS1 or SS2, has enabled TCBC control via switch function 52, LV_TCBC_EN causes a switch function 54 to select a parameter EGBP_DIF_BPA for further processing. Two further switch functions 55, 56 assure that conditions are appropriate for actual use of EGBP_DIF_BPA. Switch function 55 is under the control of a parameter STAT_ENG_MODE_GES to assure that the engine has been started and is running. Switch function 56 is under the control of a parameter LV_LIH_TCBC_OL whose purpose is to indicate an actual or potential fault whose occurrence places the engine control system in what is referred to as a "limp-home" mode for the purpose of minimizing risk of potential damage because of the fault. This allows the engine to continue to operate so that the vehicle can be driven to a service facility for service to investigate the fault signal and make corrections as needed.

Hence, with the engine running and in the absence of any indicated fault, the parameter EGBP_DIF_BPA is subjected to processing using a function 58. The data value of EGBP_DIF_BPA represents the data value of exhaust back-pressure error, meaning the difference between actual exhaust back-pressure and the exhaust back-pressure pressure set-point. Function 58 defines upper and lower limits for a data value EGBP_DIF_TCBC used in subsequent processing. If the data valve for EGBP_DIF_BPA is greater than a data value representing the upper limit (C_TCBC_EGBP_DIF_MAX), the upper limit value is used in further processing as a parameter EGBP_DIF_TCBC, and if the data value for EGBP_DIF_BPA is less than that representing the lower limit (C_TCBC_EGBP_DIF_MIN), the lower limit value is used in further processing as the data value for EGBP_DIF_TCBC. Otherwise, the data value for EGBP_DIF_BPA becomes the data value for EGBP_DIF_TCBC.

The further processing of EGBP_DIF_TCBC is performed by a PID controller 60 that performs one or more of proportional, integral, and derivative functions on EGP_DIF_TCBC to provide data values 60P, 60I, and 60D that are summed by a summing function 62. The processing may include the use of other data not specifically shown here. Subsequent processing of the sum provided by function 62 is allowed by a switch function 64 when TCBC control is enabled. Otherwise PID controller 60 provides a zero output.

The data value output of PID controller 60 is summed with the data value of a parameter TCBC_PWM_PCTL by a summing function 66. The sum is processed by the portion of the strategy shown in FIG. 4 to yield a data value for TCBC_PWM, as will be more fully explained hereinafter. With TCBC control enabled, the output of PID controller 60 represents a closed-loop control component for valves 20 and 22 because it has been developed by processing of exhaust back-pressure error. TCBC_PWM_PCTL represents a feed-forward, open-loop component for TCBC control. As will be more fully explained in subsequent description, this open-loop component is available for use in controlling valves 20 and 22 regardless of whether PID controller 60 is providing any control component for TCBC control, but whether any open-loop component is actually summed at summing function 66 depends on certain conditions affecting the portion of the strategy shown in FIG. 3.

That Figure shows how parameter TCBC_PWM_PCTL is developed. Four maps 70, 80, 90, and 100 are used in conjunction with engine speed N and indicated torque TQI BPA to develop data values for respective parameters TCBC_PWM_PCTL_PROT, TCBC_PWM_PCTL_EGR_OFF, TCBC_PWM_PCTL_EGR_ON, and TCBC_PWM_PCTL_TCBC_OFF. The respective maps are populated with data values for those four respective parameters, each data value being correlated with a respective pair of data values representing a particular engine speed range and a particular engine torque range. Current data values for engine speed and indicated torque cause the corresponding data value that populates the respective map to be made available for further processing under appropriate conditions.

The portion of the strategy shown in FIG. 3 further includes summing functions 82, 88, multiplication functions 84, 86, and switch functions 92, 94, and 114.

When the engine control system has been placed in limp-home mode, LV_LIH_TCBC_OL operates switch function 114 to cause map 70 alone to provide the data value for TCBC_PWM_PCTL. When the engine control system is not in limp-home mode, the data value for a parameter TCBC_PWM_PCTL_BAS serves as the data value for TCBC_PWM_PCTL.

How the data value for TCBC_PWM_PCTL_BAS is calculated depends on whether TCBC control is enabled. If TCBC control is not enabled, switch function 94 causes map 100 alone to provide the data value for TCBC_PWM_PCTL_BAS, and hence TCBC_PWM_PCTL, provided that map 100 has been populated with data, such populating being done to allow a feed-forward component to be applied to open valve 20 and 22 in certain situations when TCBC control has not enabled by LV_TCBC_EN.

If TCBC control is enabled, switch function 94 causes maps 80 and 90 to be used in various ways depending on the value of a parameter FAC_EGR_SP_BAS to provide the data value for TCBC_PWM_PCTL_BAS, and hence TCBC_PWM_PCTL.

If a parameter LC_PCTL_TCBC is operating switch function 92 to a first switch state, the data value for TCBC_PWM_PCTL_BAS is obtained solely from map 90. If LC_PCTL_TCBC is operating switch function 92 to a second switch state, the data value for TCBC_PWM_PCTL_BAS is obtained either 1) solely from map 80, 2) solely from map 90, or 3) by interpolating data from both maps 80 and 90. Which of those three possibilities is actually used depends on the data value for FAC EGR_SP BAS, which can be any value in the range extending from 0 to 1 inclusive, and which represents a dynamic correction multiplier for performing the interpolation using functions 82, 84, 86, and 88 in the manner shown.

Figure 2A:
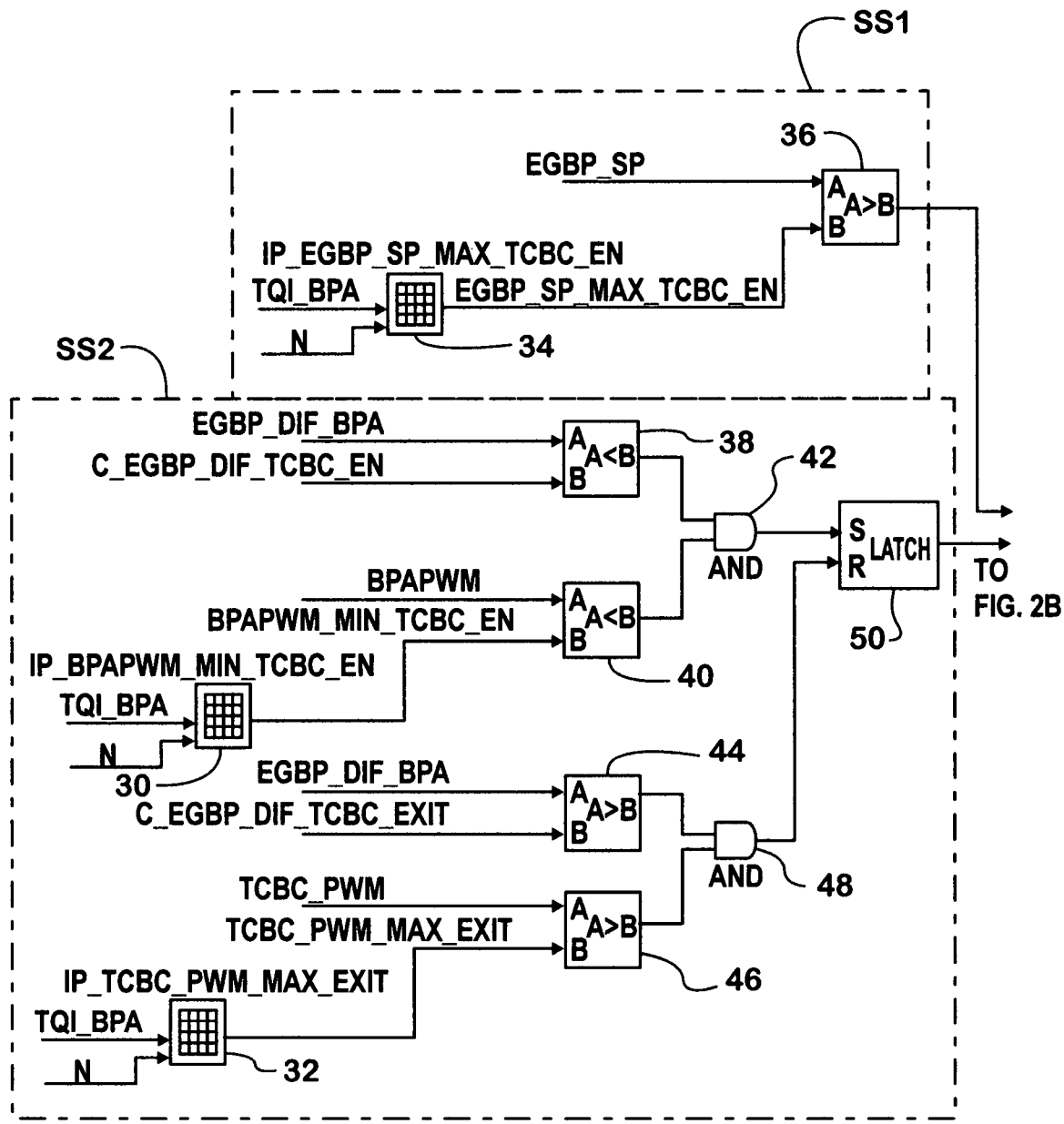
FIGS. 2A and 2B collectively show a first portion of a software strategy diagram representing algorithms programmed in an engine control system in accordance with principles of the present invention.
Figure 2B:
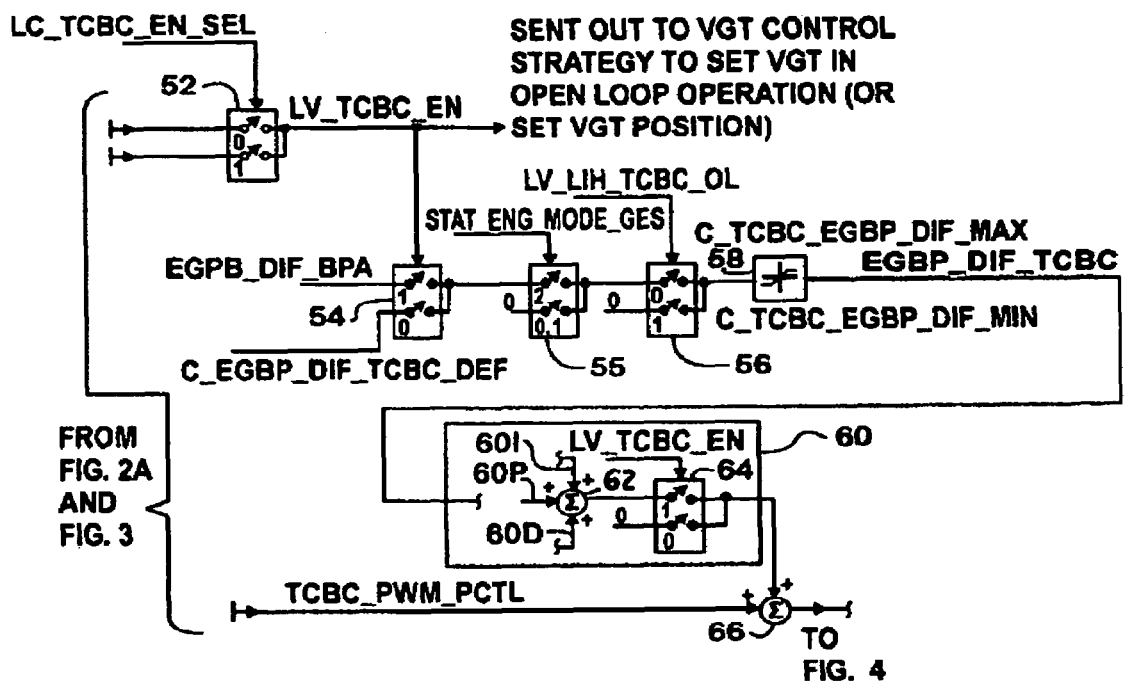

TCBC_PWM is the result of processing performed by the portion of the strategy shown by FIG. 4 that comprises functions 116, 118, 120, 122, and 124. The data value from summing function 66 in FIG. 2B is represented by the parameter TCBC_PWM_BAS and is shown as a control input to function 116 in FIG. 4.

Function 116 is a switch function that can be used to substitute a selectable parameter C_TCBC_CONF for TCBC_PWM_BAS when manual control of TCBC_PWM is needed, such as for development or diagnostic purposes.

Function 118 is a limiting function that limits the input data value to a maximum C_TCBC_PWM_MAX and to a minimum C_TCBC_PWM_MIN.

Function 120 is a switch function that when limp-home mode is indicated by LV_LIH_TCBC_DFT applies a default input value (parameter C_TCBC_PWM_DFT) to switch function 122 instead of the control value passed by function 118. The same default parameter can also be passed by switch function 122 based on engine state as determined by comparison function 124.

While a presently preferred embodiment of the invention has been illustrated and described, it should be appreciated that principles of the invention apply to all embodiments falling within the scope of the invention that is generally described as follows.

What is claimed is:

1. A method of exhaust back-pressure control in an internal combustion engine having an intake system for developing charge air for the engine, combustion chambers in which admitted charge air and injected fuel combust to operate the engine, an exhaust system for conveyance of exhaust gas resulting from combustion from the combustion chambers, a two-stage turbocharger comprising an upstream compressor upstream of a downstream compressor in the intake system operated respectively by a downstream turbine downstream of an upstream turbine in the exhaust system, a turbine-shunting bypass valve shunting one of the turbines with which a mechanism for adjusting exhaust back-pressure that the turbocharger is creating on the engine is associated, the downstream compressor and the upstream turbine comprising a high-pressure stage of the turbocharger, with the upstream turbine being the one turbine shunted by the turbine-shunting bypass valve and the downstream compressor being shunted by a compressor-shunting bypass valve, and a control system, comprising a processor, for operating the mechanism and for operating the turbine-shunting bypass valve, the method comprising:

executing an algorithm in the processor according to a strategy for selectively causing the control system to be unenabled from operating the turbine-shunting bypass valve when the control system is operating the mechanism to adjust back-pressure within a range of effectiveness for the mechanism to control exhaust back-pressure and to be enabled to operate the turbine-shunting bypass valve when the control system has operated the mechanism to a limit of the range of effectiveness;

controlling exhaust back-pressure by selectively positioning adjustable vanes of the upstream turbine when the control system is unenabled;

wherein the strategy for selectively causing the control system to be enabled to operate the turbine-shunting bypass valve also causes the control system to be enabled to operate the compressor-shunting bypass valve, and the strategy comprises comparing a data value representing a set-point for desired exhaust back-pressure and a data value representing a set-point defining a maximum that is based on at least one parameter indicative of current engine operation and that needs to be exceeded by the set-point for desired exhaust back-pressure in order to enable the control system to operate the bypass valves, and enabling the control system to operate the bypass valves when the result of the comparing step discloses that the set-point for desired exhaust back-pressure exceeds the defined maximum.

2. The method as set forth in claim 1 wherein the processor comprises a map containing data values representing set-points defining maximums that are based on engine speed and engine torque, and the comparing step compares a data value representing a set-point for desired exhaust back-pressure and a data value selected from the map using data values for current engine speed and current engine torque.

3. The method as set forth in claim 1 comprising selectively operating a latch function to one of set and reset states to enable the control system to operate the bypass valves and to the other of the set and reset states to unenable the control system from operating the bypass valves.

4. The method as set forth in claim 3 comprising processing data values representing certain parameters to cause the latch function to be operated to the set state when one set of relationships is disclosed and to be operated to the reset state when another set of relationships is disclosed.

5. The method as set forth in claim 4 wherein the step of processing data values representing certain parameters to cause the latch function to be operated to the set state comprises:

comparing a data value representing a difference between actual exhaust back-pressure and a set-point for desired exhaust back-pressure and a data value representing a difference that distinguishes between the existence and the non-existence of a need to enable the control system to operate the bypass valves;

comparing a data value representing a setting to which the adjustable vanes are being currently commanded and a data value defining a limit of a range of settings within which the adjustable vanes are effective by themselves in controlling exhaust back-pressure based on one or more current engine operating parameters;

and causing the latch function to be operated to the set state upon concurrence of the first-mentioned comparing step disclosing that the difference between the actual exhaust back-pressure and the set-point for desired exhaust back-pressure is disclosing a need to enable the control system to operate the bypass valves and of the second-mentioned comparing step disclosing that the setting to which the adjustable vanes are being currently commanded is not within the range of settings within which the adjustable vanes can be effective by themselves in controlling exhaust back-pressure based on one or more current engine operating parameters.

6. The method as set forth in claim 4 wherein the step of processing data values representing certain parameters to cause the latch function to be operated to the reset state comprises:

comparing a data value representing a difference between actual exhaust back-pressure and a set-point for desired exhaust back-pressure and a data value representing a difference that distinguishes between the existence and the nonexistence of a need to unenable the control system from operating the bypass valves;

comparing a data value representing a setting to which the adjustable vanes are being currently commanded and a data value defining a limit of a range of settings within which the adjustable vanes can be effective by themselves in controlling exhaust back-pressure based on one or more current engine operating parameters;

causing the latch function to be operated to the reset state upon concurrence of the first-mentioned comparing step disclosing that the difference between the actual exhaust back-pressure and the set-point for desired exhaust back-pressure is disclosing a need to unenable the control system from operating the bypass valves and of the second-mentioned comparing step disclosing that the setting to which the adjustable vanes are being currently commanded is within the range of settings within which the adjustable vanes are effective by themselves in controlling exhaust back-pressure based on one or more current engine operating parameters.

7. The method as set forth in claim 1 comprising controlling the bypass valves collectively by a closed-loop control sub-strategy and a feed-forward, open-loop control sub-strategy when the control system is enabled to operate the bypass valves, and performing the open-loop control sub-strategy by using a data value from at least one map containing data values representing exhaust gas recirculation values correlated with engine speed and engine torque.

8. An internal combustion engine comprising:
an intake system for developing charge air for the engine;
combustion chambers in which admitted charge air and injected fuel combust to operate the engine;
an exhaust system for conveyance of exhaust gas resulting from combustion from the combustion chambers;
a two-stage turbocharger comprising an upstream compressor upstream of a downstream compressor in the intake system operated respectively by a downstream turbine downstream of an upstream turbine in the exhaust system;

a turbine-shunting bypass valve shunting one of the turbines with which a mechanism for adjusting exhaust back-pressure that the turbocharger is creating on the engine is associated;
a compressor-shunting bypass valve shunting the compressor that is operated by the one turbine;
and a control system, comprising a processor, for operating the mechanism and for operating the turbine-shunting bypass valve according to a strategy wherein the processor executes an algorithm for selectively unenabling the control system to operate the turbine-shunting bypass valve when the control system is operating the mechanism to adjust back-pressure within a range of effectiveness for the mechanism to control exhaust back-pressure and enabling the control system to operate the turbine-shunting bypass valve when the control system has operated the mechanism to a limit of the range of effectiveness;
wherein the strategy for selectively enabling and unenabling the control system to operate the turbine-shunting bypass valve also functions to selectively enable and unenable the control system to operate the compressor-shunting bypass valve, and the strategy comprises a comparison function for comparing a data value representing a set-point for desired exhaust back-pressure and a data value representing a set-point defining a maximum that is based on at least one parameter indicative of current engine operation and that needs to be exceeded by the set-point for desired exhaust back-pressure in order to enable the control system to operate the bypass valves, and the strategy enables the control system to operate the bypass valves when the comparison function discloses that the set-point for desired exhaust back-pressure exceeds the defined maximum.

9. An internal combustion engine comprising:
an intake system for developing charge air for the engine;
combustion chambers in which admitted charge air and injected fuel combust to operate the engine;
an exhaust system for conveyance of exhaust gas resulting from combustion from the combustion chambers;
a two-stage turbocharger comprising an upstream compressor upstream of a downstream compressor in the intake system operated respectively by a downstream turbine downstream of an upstream turbine in the exhaust system;
a turbine-shunting bypass valve shunting one of the turbines with which a mechanism for adjusting exhaust back-pressure that the turbocharger is creating on the engine is associated;
a compressor-shunting bypass valve shunting the compressor that is operated by the one turbine;
wherein the downstream compressor and the upstream turbine comprise a high-pressure stage of the turbocharger, with the upstream turbine being the one turbine shunted by the turbine-shunting bypass valve and the downstream compressor being shunted by the compressor-shunting bypass valve, and wherein the mechanism comprises adjustable vanes of the upstream turbine;
and a control system, comprising a processor, for operating the mechanism and for operating the turbine-shunting bypass valve according to a strategy wherein the processor executes an algorithm for selectively unenabling the control system to operate the turbine-shunting bypass valve when the control system is operating the mechanism to adjust back-pressure within a range of effectiveness for the mechanism to control exhaust back-pressure and enabling the control system to operate the turbine-shunting bypass valve when the control system has operated the mechanism to a limit of the range of effectiveness;

wherein the strategy for selectively enabling and unenabling the control system to operate the turbine-shunting bypass valve also functions to selectively enable and unenable the control system to operate the compressor-shunting bypass valve, and the strategy comprises a comparison function for comparing a data value representing a set-point for desired exhaust back-pressure and a data value representing a set-point defining a maximum that is based on at least one parameter indicative of current engine operation and that needs to be exceeded by the set-point for desired exhaust back-pressure in order to enable the control system to operate the bypass valves, and the strategy enables the control system to operate the bypass valves when the comparison function discloses that the set-point for desired exhaust back-pressure exceeds the defined maximum.

10. The engine as set forth in claim 9 wherein the strategy comprises a map containing data values representing set-points defining maximums that are based on engine speed and engine torque, and the comparison function compares a data value representing a set-point for desired exhaust back-pressure and a data value selected from the map using data values for current engine speed and current engine torque.

11. The engine as set forth in claim 9 wherein the strategy comprises a latch function that is selectively operable to set and reset states, that enables the control system to operate the bypass valves when in one of those states, and that unenables the control system to operate the bypass valves when in the other of those states.

12. The engine as set forth in claim 11 wherein the strategy comprises functions for processing data values representing certain parameters to cause the latch function to be operated to the set state when one set of relationships is disclosed and to be operated to the reset state when another set of relationships is disclosed.

13. The engine as set forth in claim 12 wherein the functions for processing data values representing certain parameters to cause the latch function to be operated to the set state comprise:

a first comparison function for comparing a data value representing a difference between actual exhaust back-pressure and a set-point for desired exhaust back-pressure and a data value representing a difference that distinguishes between the existence and the non-existence of a need to enable the control system to operate the bypass valves;

a second comparison function for comparing a data value representing a setting to which the adjustable vanes are being currently commanded and a data value defining a limit of a range of settings within which the adjustable vanes are effective by themselves in controlling exhaust back-pressure based on one or more current engine operating parameters;

and a function for causing the latch function to be operated to the set state upon concurrence of the first comparison function disclosing that the difference between the actual exhaust back-pressure and the set-point for desired exhaust back-pressure is disclosing a need to enable the control system to operate the bypass valves and of the second comparison function disclosing that the setting to which the adjustable vanes are being currently commanded is not within the range of settings within which the adjustable vanes can be effective by themselves in controlling exhaust back-pressure based on one or more current engine operating parameters.

14. The engine as set forth in claim 12 wherein the functions for processing data values representing certain parameters to cause the latch function to be operated to the reset state comprise:

a first comparison function for comparing a data value representing a difference between actual exhaust back-pressure and a set-point for desired exhaust back-pressure and a data value representing a difference that distinguishes between the existence and the non-existence of a need to unenable the control system to operate the bypass valves;

a second comparison function for comparing a data value representing a setting to which the adjustable vanes are being currently commanded and a data value defining a limit of a range of settings within which the adjustable vanes can be effective by themselves in controlling exhaust back-pressure based on one or more current engine operating parameters;

and a function for causing the latch function to be operated to the reset state upon concurrence of the first comparison function disclosing that the difference between the actual exhaust back-pressure and the set-point for desired exhaust back-pressure is disclosing a need to unenable the control system to operate the bypass valves and of the second comparison function disclosing that the setting to which the adjustable vanes are being currently commanded is within the range of settings within which the adjustable vanes are effective by themselves in controlling exhaust back-pressure based on one or more current engine operating parameters.

15. The engine as set forth in claim 9 wherein the strategy includes a closed-loop control sub-strategy and a feed-forward, open-loop control sub-strategy that are collectively effective to control the bypass valves when the control system is enabled to operate the bypass valves, and the open-loop control sub-strategy is based on at least one map containing data values representing exhaust gas recirculation values correlated with engine speed and engine torque.

* * * * *